June 11, 1963

E. WILDHABER 3,092,982

UNIVERSAL JOINT

Filed Sept. 5, 1961

INVENTOR:

Ernest Wildhaber

June 11, 1963 — E. WILDHABER — 3,092,982
UNIVERSAL JOINT
Filed Sept. 5, 1961 — 2 Sheets-Sheet 2

INVENTOR:
Ernest Wildhaber

United States Patent Office
3,092,982
Patented June 11, 1963

3,092,982
UNIVERSAL JOINT
Ernest Wildhaber, Brighton, N.Y.
(124 Summit Drive, Rochester 20, N.Y.)
Filed Sept. 5, 1961, Ser. No. 136,413
10 Claims. (Cl. 64—21)

The present invention relates to universal joints and particularly to so-called double universal joints. In such double universal joints the entire transmitted troque passes through each individual joint. The two individual joints are spaced apart, and uniform motion is transmitted when the axes of the driving end part and of the driven end part intersect midway between said two joints. Centering means are used to constrain said axes to intersect.

One object of the present invention is to devise improved centering means that operate accurately when the two individual joints have either a varying distance or a fixed distance from one another. Furthermore, centering means shall be devised that constrain said axes to intersect exactly midway between said two joints at all shaft angularities, and broadly that constrain said axes to intersects at distances from said joints that have a predetermined constant proportion to each other.

A further aim is to devise an improved double universal joint embodying said centering means, and broadly an improved universal joint.

Figure 1:
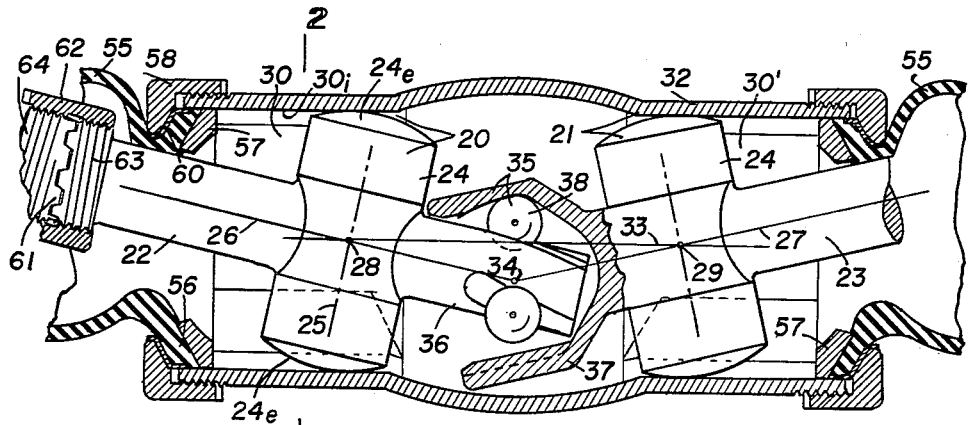
FIG. 1 is an axial section of a double universal joint embodying the present invention, the two individual joints thereof having a varying distance from one another. The double universal joint is shown at maximum angularity and with the two individual joints closest to each other.
Figure 2:
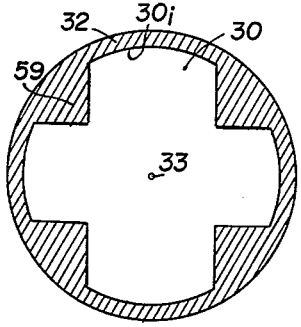
FIG. 2 is a section along lines 2—2 of FIG. 1 of the member connecting the two individual joints.

The double universal joint shown and described with FIGS. 1 to 8 comprises two individual universal joints 20, 21 with end parts 22, 23 respectively. Each end part 22, 23 carries a pair of coaxial cylindrical rollers 24 whose axis 25 intersects the axes 26, 27 of the respective end part at right angles, at centers 28, 29 respectively. The said rollers engage aligned straight ways 30, 30' provided internally on a connecting member 32, shown in cross-section in FIG. 2. The spherical end surfaces 24e of the rollers engage the cylindrical bottom surfaces 30i of the ways 30, 30', so that the centers 28, 29 are kept on the axis 33 of the connecting member 32.

Individual universal joints of this roller type transmit the same motion as the common Cardan joint, and may be called Cardan-type joints.

Uniform motion is transmitted between the end parts 22, 23 when their axes 26, 27 intersect at a point 34 midway between the centers 28, 29. Inasmuch as the two roller pairs and their centers 28, 29 are free to move towards and away from each other along axis 33, the intersection point 34 of the axes 26, 27 has a varying distance from the centers 28, 29. The centering means 35 constructed according to the invention always keeps distance 28—34 equal to distance 29—34 at all distances. It comprises a grooved projection 36 coaxial and rigid with one end part (22), an internally grooved cup-shaped portion 37 coaxial and rigid with the other end part (23), and balls (38) engaging the grooves of the two projections.

Figure 3:
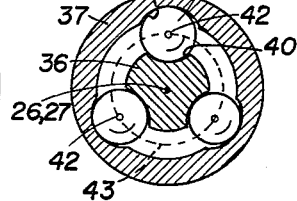
FIG. 3 is a cross-section through the centering means shown in FIG. 1, with the axes of the universal joint in alignment.

FIG. 3 shows a cross-section of the centering means 35 when the axes 26, 27 are in alignment. A plurality of balls 38 are used, at least three. The several grooves 40 of projection 36 are identical and equally spaced about axis 26. Grooves 41 of cup 37 are also identical. They are equally spaced about axis 27 and extend at an angle to the adjacent grooves 40. The ball centers 42 thus lie on a circle 43 centered on the aligned axes 26, 27.

In the embodiment illustrated in FIGURES 1 to 8 the grooves 40 are helical surfaces that extend about the axis 26 of projection 36. Grooves 41 are helical surfaces extending about axis 27. The grooves 40, 41 have the same constant lead, but opposite hand, one set being right hand and the other set being left hand.

Figure 13:
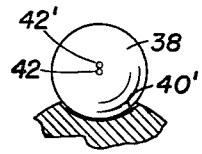
FIG. 13 is an enlarged fragmentary section of a centering portion, taken at right angles to the path of a ball center.

The helical relative path of a ball center with respect to each end part 22, 23 is a helix about the axis of said member. This helix has a constant lead throughout its length. It is also the center line of the respective groove when the groove profile fully matches the circular ball profile in a section perpendicular to said path. The groove profile in such normal section is then a circular arc centered at the ball center 42 (FIG. 13); and the radius of said arc is equal to the ball radius. Such grooves shall be called basic grooves. If desired the groove profiles may be eased off at opposite ends. Arcuate groove profiles 40' are then used whose center 42' is slightly offset from the ball center 42. Such grooves are slight modifications of the basic grooves.

Figure 6:
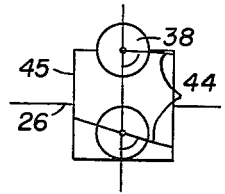
FIG. 6 is a side view of the surface of revolution containing the paths of the ball centers with respect to projection 36 of FIG. 1.
Figure 7:
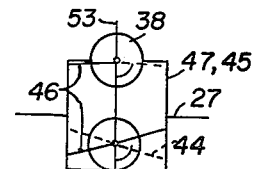
FIG. 7 is a similar side view of the surface of revolution which contains the paths of the ball centers with respect to cup 37 of FIG. 1. It also shows in dotted lines the paths of FIG. 6 superimposed to those of FIG. 7, when the axes of the universal joint are in alignment.

The latter will be particularly described, as they afford the best definition. The helical center lines 44 of the basic grooves 40 lie on a cylindrical surface 45 with axis 26 (FIG. 6). The helical center lines 46 of the basic grooves 41 lie on a cylindrical surface 47 with axis 27 (FIG. 7). Surfaces 45, 47 may be called the pitch surfaces of the grooves 40, 41. They have equal radii when referring to basic grooves. Lines 44, 46 may be called their pitch lines.

Figure 4:
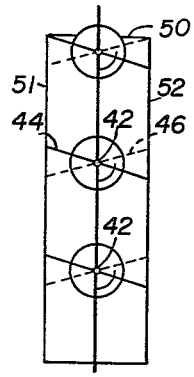
FIG. 4 and FIG. 5 are diagrams explanatory of the action of the novel centering means, and of how the balls remain midway between the two individual joints even though the distance between said individual joints varies.

FIG. 4 is a development of these cylindrical pitch surfaces to a plane. The development of both surfaces coincide when their axes are in alignment. The helical pitch lines show up as straight lines in development. Pitch lines 44 are shown as full lines, while pitch lines 46 are shown dotted. As they are helices of opposite hand and equal lead, they are oppositely and equally inclined to the axial direction 50. They intersect at the ball centers 42, midway between the ends 51, 52 of the pitch surfaces.

Figure 5:
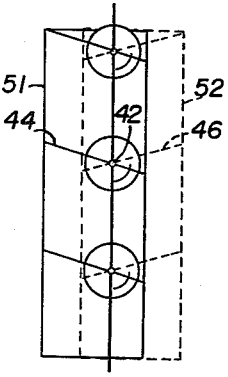
Figure 9:
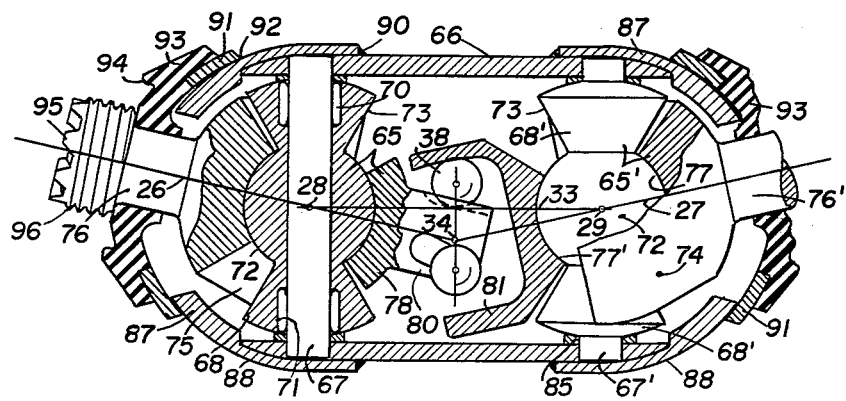
FIG. 9 is an axial section of a modified form of double universal joint constructed according to the present invention.

FIG. 5 shows the ends 51, 52 shifted further apart axially. Again the pitch lines 44, 46 intersect at the ball centers 42. These have now different but still equal distances from the ends 51, 52. Accordingly the plane of the ball centers remains midway between the two joints and midway between their centers 28, 29.

FIG. 7 shows pitch surface 45 superimposed to pitch surface 47 in a coaxial position. Its pitch lines 44 are indicated in dotted lines, while pitch lines 46 are shown in full lines. The balls 38 have their centers 42 at the intersection of the pitch lines 44, 46.

Figure 8:
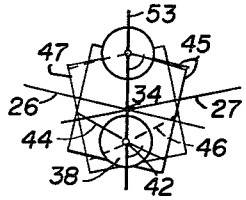
FIG. 8 shows the two surfaces of revolution of FIGS. 6 and 7 and their paths superimposed at shaft angularity.

FIG. 8 shows the pitch surfaces 45, 47 with their axes 26, 27 at an angle and intersecting at 34. The pitch lines 44, 46 intersect in a plane 53 which bisects the angle between the axes 26, 27. The ball centers 42 are at said intersections and thus lie in said bisecting plane 53. This plane remains the plane of symmetry of opposite pitch lines 44, 46. The pitch lines 44, 46 are the mirror images of each other with respect to bisecting plane 53, which remains midway between the centers 28, 29 (FIG. 1). Thus the axes 26, 27 are constrained by the balls to intersect midway between the centers 28, 29. Transmission of uniform motion is assured at all angularities and at all distances 28—29 within the design limits.

Other than helical center lines or pitch lines 44, 46 are also possible. The broad requirement is that in the aligned position of the axes 26, 27 the opposite pitch lines are the mirror images of one another with respect to plane of symmetry 53 (FIG. 7). Preferably also they should be tangent to the cylindrical surfaces 45, 47 in plane 53, so that chiefly radial pressure is transmitted through the balls. For instance the grooves may be straight, with the pitch lines of the basic grooves oppositely and equally inclined to the direction of their axis.

In all such cases the ball centers remain in the plane that bisects the angle between the axes (26, 27) of the end parts, so that the balls constrain said axes to intersect at a point of said plane. Uniform motion is transmitted when by design said plane is set to equal distances from the two individual universal joints.

If in special cases the axes of the end parts are to intersect at unequal distances of given proportion, helical cooperating grooves of different lead may be used, the leads having the same proportion as said distances. A predetermined kind of varying motion is then transmitted at shaft angularity.

While I have shown a specific form of individual universal joint, the novel centering means apply as well to any form, whether the joint be of roller type or of pivot type. Such a joint may be broadly defined as a torque-transmitting pivotal connection between an end part (22 or 23) and the connecting member (32).

The double universal joint illustrated has flexible seals 55 attached at opposite ends. A flange-like projection 56 of each seal is clamped between a ring 57 and a nut 58 that threads onto the end of the connecting member 32. Ring 57 rests on the ends of the teeth 59 (FIG. 2) that form the ways 30 or 30'. A thin-walled ring 60 may be interposed between the nut 58 and portion 56. It is preferably made of low-friction material, as for instance nylon, and by some corrugations or otherwise is made to stay with the flexible seal, while the nut turns on it in the clamping operation. A toothed face coupling 61 permits to connect and disconnect part 22 and a coaxial shaft portion. The coupling is kept in engagement by a nut 62 that engages threads 63, 64 of opposite hand provided on the two mating coupling halves.

The cup-shaped portion 37 may be produced by forging followed by a cold-working process, where a tool containing balls like balls 38 is constrained to move helically into the cup. The balls may be mounted on the tool in fixed positions of their centers.

The embodiment illustrated in FIGS. 9 to 12 is also a roller type double universal joint. Here however the distance between the individual joints 65, 65' is fixed, as it is also in the conventional pivot-type universal joints. The two joints 65, 65' have a common connecting member 66 that is a cylindrical sleeve. It holds a pair of parallel pins 67, 67' whose axis intersects the sleeve axis 33 at right angles, at centers 28, 29 respectively. One-piece rolling elements 68, 68' are rotatably mounted on the pins 67, 67' respectively, with needle bearings 70 or roller bearings. The needles of each bearing roll in a cylindrical recess 71 provided at each outer end of element 68 or 68'. Each element 68, 68' contains a spherical center portion 72 and conical or tapered end portions 73. Their conical working surfaces have a common apex at center 28 or 29, respectively.

The said conical working surfaces are capable of rolling without sliding on one side or the opposite side of conical ways 75 provided on heads 74 of end parts 76, 76', respectively. The ways extend about centers 28, 29, respectively. Opposite ways are coaxial. Their common axis is perpendicular to the drawing plane of FIG. 9. On end part 76 this axis passes through center 28; on end part 76' it passes through center 29. The motion transmitted between end part 76 or 76' and the connecting member 66 through the rolling element and the ways is the same as the motion transmitted in a Cardan joint.

Figure 10:
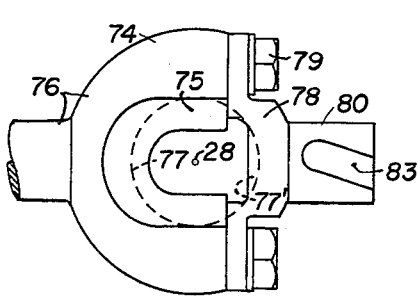
FIG. 10 and FIG. 11 are plan views of the two end parts of the double universal joint illustrated in FIG. 9.
Figure 11:
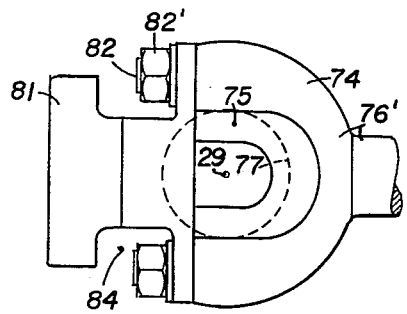
Figure 12:
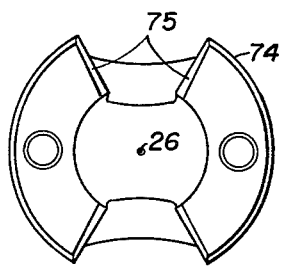
FIG. 12 is a front view taken in axial direction of one of said end parts.

The heads 74 contain each a hemispherical cavity 77 fitting the spherical center portion 72 of the rolling element. It is followed by a cylindrical inside surface of the same diameter. A part 78 is rigidly secured to head 74 of end part 76, as by screws 79 (FIG. 10). It contains a concave spherical portion 77' matching portion 72, and together with cavity 77 holds the rolling element 68 at center 28. It should be noted that this centering constraint is at the inside of the ways 75, whereby the outside diameter of the universal joint can be kept at a minimum. Part 78 may be provided with a centering projection (not shown) fitting said cylindrical inside surface. Part 78 also contains an externally grooved projection 80 coaxial with end part 76.

An internally grooved cup-shaped portion 81 is rigidly secured to end part 76', by screws 82 and nuts 82'. Portion 81 surrounds projection 80. I have shown straight grooves 83 on projection 80, to work with straight grooves in cup 81. The grooves are askew to their respective axis 26 or 27 and are at an angle to each other. The pitch lines of the basic grooves are symmetrical with respect to a central plane, as described with FIG. 7.

Helical grooves or other grooves might also be used. The balls 38 engage opposite grooves and keep the axes 26, 27 intersecting at 34, midway between the centers 28, 29.

Recesses 84 are provided on portion 81 to facilitate assembly of the nuts 82'. Portion 81 also contains a spherical surface portion 77' matching the spherical portion 72 or rolling element 68', and with cavity 77 of head 74 constitutes socket means keeping the rolling element 68' at center 29.

Portion 81 may be made up of two pieces if desired.

Washers 85 may be used to maintain the needles of the bearings 70 axially aligned; or spherical recesses of ring shape may be provided on sleeve 66 for the two pins. Sleeve 66 has end caps 87 attached thereto, having spherical outside surfaces 88 centered at 28 and 29, respectively. The caps 87 may be bonded, soldered or otherwise secured at a seam 90 to the sleeve 66.

A scraper 91 with circular edge 92 engages spherical surface 88 and keeps dirt from entering. It is bonded to a flexible ring 93 of rubber-like material, which seats on end part 76 or 76', respectively. A circular projection 94 permits to obtain a hold on ring 93 to expand it for taking it off.

A toothed face-coupling member 95 with threaded outside surface 96 is provided on end part 76, for connecting it to a coaxial shaft portion.

It is seen that the centering means constructed according to my invention for double universal joints comprise a special kind of ball bearing that stays midway between the two individual universal joints by itself, and whose balls have chiefly rolling contact.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

I claim:

1. A double universal joint comprising two end parts and a connecting member, a torque-transmitting pivotal connection between each end part and said connecting member so that the axis of each end part intersects the axis of said connecting member, said two pivotal connections being spaced apart, and centering means constraining the axes of said two end parts to intersect between said pivotal connections, said centering means comprising an externally grooved projection coaxial and rigid with one end part, an internally grooved portion surrounding said projection and being coaxial and rigid with the other of said two end parts, the grooves of said projection extending at an angle to the adjacent grooves of said internally grooved portion, and balls engaging said grooves.

2. A double universal joint according to claim 1, wherein the grooves of said projection and of said internally grooved portion are helical surfaces of equal lead end and of opposite hand extending about the axis of said projection and of said internally grooved portion respectively.

3. A double universal joint according to claim 1, wherein the grooves of said projection and of said internally grooved portion have concave arcuate profiles adapted to engage the balls, said grooves coinciding approximately with basic grooves that completely match an arc of the circular ball profile, the center lines of the basic grooves of said projection being the mirror image of the center lines of the basic grooves of said portion with respect to a central plane containing the ball centers, when the axes of said end parts are aligned.

4. A double universal joint according to claim 1, wherein the grooves of said projection and of said internally grooved portion are straight and askew to their respective axis.

5. A double universal joint according to claim 1, wherein the plane of the ball centers is midway between said pivotal connections.

6. A double universal joint comprising two end parts and a connecting member, each of said end parts mounting a pair of coaxial rollers, said connecting member containing straight ways for engagement with said two pairs of rollers in spaced regions, means for constraining the axis of each end part to intersect the axis of said connecting member, and centering means constraining the axes of said end parts to intersect between said two pairs of rollers, said centering means comprising an externally grooved projection coaxial and rigid with one end part, an internally grooved portion surrounding said projection and being coaxial and rigid with the other of said two end parts, the grooves of said projection extending at an angle to the adjacent grooves of said internally grooved portion, and balls engaging said grooves.

7. A double universal joint comprising two end parts and a connecting member, said connecting member mounting a pair of coaxial tapered rollers adjacent each of its opposite ends, said end parts containing essentially conical ways for engagement with said rollers, means for constraining the axis of said connecting member to intersect the axis of each of said two end parts, and centering means constraining the axes of said end parts to intersect between said two pairs of rollers, said centering means comprising an externally grooved projection coaxial and rigid with one end part, an internally grooved portion surrounding said projection and being coaxial and rigid with the other of said two end parts, the grooves of said projection extending at an angle to the adjacent grooves of said internally grooved portion, and balls engaging said grooves.

8. A double universal joint comprising two end parts and a connecting member, said connecting member mounting a pair of coaxial tapered rollers adjacent each of its opposite ends, the rollers of each pair being rigid with one another, a spherical portion provided between each pair of rollers concentric therewith, said end parts having a fork-like shape with two prongs and having essentially conical ways provided on the adjacent sides of said prongs for engagement with said rollers, a tie connecting the ends of the two prongs of each end part, socket portions provided on said end part and on said tie for engagement with opposite sides of said spherical portion, and centering means for constraining the axes of said end parts to intersect approximately midway between said two pairs of rollers, said centering means being formed on said ties.

9. In a universal joint, a pair of rotatable parts, a pair of coaxial tapered rollers rigid with one another rotatably mounted on one of said parts with their axis maintained at right angles to the axis of said one part, the means for rotatably mounting said rollers comprising a pin that extends through a bore provided in said rollers coaxial therewith and that engages a bore provided on said one part, a spherical portion provided between said pair of rollers concentric therewith, the other of said rotatable parts having a fork-like shape with two prongs and having essentially conical ways provided on the adjacent sides of said prongs for engagement with said rollers, a tie connecting the ends of said prongs, and socket portions provided on said other part and on said tie for engagement with opposite sides of said spherical portion.

10. The combination according to claim 9, wherein the spherical portion is formed integral wtih the pair of tapered rollers.

References Cited in the file of this patent

UNITED STATES PATENTS

| 1,836,987 | Peake | Dec. 15, 1931 |
| 1,933,494 | Chilton | Oct. 31, 1933 |
| 2,625,018 | Dunn | Jan. 13, 1953 |
| 2,662,381 | Wildhaber | Dec. 15, 1953 |
| 2,777,307 | Wildhaber | Jan. 15, 1957 |
| 2,964,928 | Marquis | Dec. 20, 1960 |